United States Patent [19]

Auch et al.

[11] Patent Number: 4,704,032
[45] Date of Patent: Nov. 3, 1987

[54] ROTATION RATE MEASURING INSTRUMENT

[75] Inventors: Wilfried Auch, Asperg; Helmut Graf, Stuttgart; Eberhard Schlemper, Vaihingen, all of Fed. Rep. of Germany

[73] Assignee: Standard Elektrik Lorenz Aktiengesellschaft, Fed. Rep. of Germany

[21] Appl. No.: 803,461

[22] Filed: Dec. 2, 1985

[30] Foreign Application Priority Data

Dec. 21, 1984 [DE] Fed. Rep. of Germany ....... 3446663

[51] Int. Cl.$^4$ ........................ G01B 9/02; G01C 19/64
[52] U.S. Cl. .................................................. 356/350
[58] Field of Search ....................................... 356/350

[56] References Cited

U.S. PATENT DOCUMENTS 3,522,739 8/1970 Coor et al. ........................... 356/320

FOREIGN PATENT DOCUMENTS 75707 4/1983 European Pat. Off. ............ 356/350

Primary Examiner—Vincent P. McGraw
Attorney, Agent, or Firm—Christie, Parker & Hale

[57] ABSTRACT

A rotation rate measuring instrument is disclosed in which two light beams propagate through a coiled optical fiber in opposite directions. After passing through the optical fiber, the two light beams are combined and directed onto a photodetector. One of the light beams is phase-modulated in a phase-modulator before entering the optical fiber. The modulation frequency is $f_m$. The output signal of the photodetector is fed to a variable-gain amplifier whose output signal is separated into a signal of frequency $f_m$ and a signal of frequency $2f_m$. The rotation rate is derived from the signal of frequency $f_m$. The signal of frequency $2f_m$ is applied to a detector whose output is fed to an operational amplifier. The other signal applied to the operational amplifier is a reference signal of amplitude $U_R$. The operational amplifier controls the gain of the variable-gain amplifier in such a way that the output signal of the detector has the same amplitude as the reference signal $U_R$.

2 Claims, 1 Drawing Figure

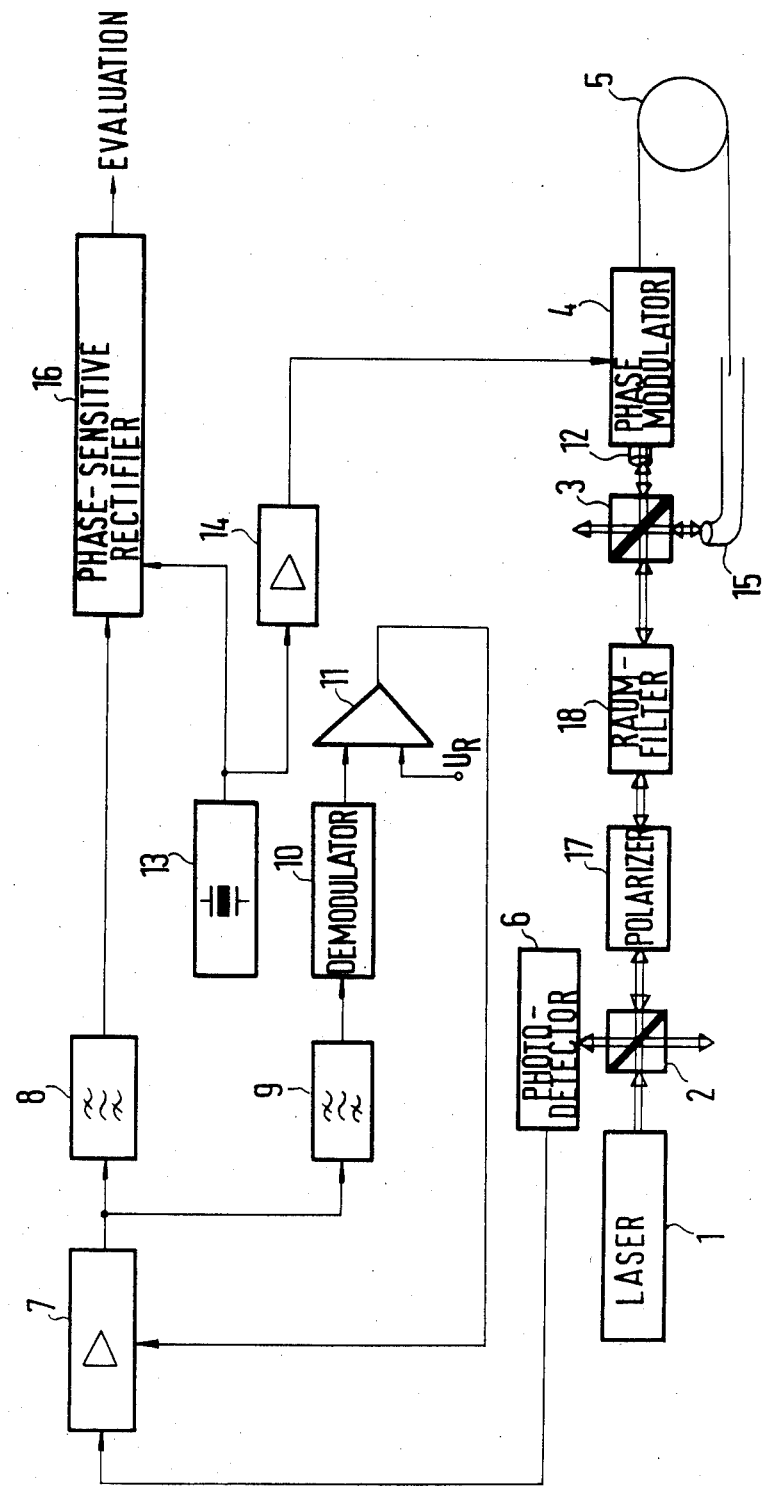

ROTATION RATE MEASURING INSTRUMENT

BACKGROUND OF THE INVENTION

The present invention relates generally to a rotation rate measuring instrument, and more particularly to an instrument of this type in which light beams launched into a looped optical fiber in opposite directions are evaluated to obtain the rotation rate therefrom.

An instrument of this kind is disclosed in German Pat. No. 31 36 688. In this instrument, a light beam generated in a light source is split into two beam portions which travel in opposite directions through an optical fiber arranged to enclose an area at least once. At least one of the two beam portions is modulated before entering the optical fiber and the two beam portions emerging from the optical fiber are combined, the combined light beam so produced being directed onto a photodetector, from the output signal of which the rotation rate is derived. In such a device, the signal to be evaluated depends on, inter alia, the intensity ($I_O$) of the light emitted by the light source and on the attenuation ($\alpha$) of the light propagating in the light paths. Variations of these quantities are disadvantageous during evaluation.

German published application DE-OS No. 30 40 514 discloses a rotation rate measuring instrument of the same kind. One of the solutions described there is to split the output signal of the photodetector into at least two signal components of different frequencies. A control signal is derived from one of the signal components. The control signal is used to control a phase modulator which modulates the light traversing a coiled optical fiber. The control is such that at least one of the signal components becomes as small as possible.

SUMMARY OF THE INVENTION

Accordingly, it is a general object of the present invention to avoid the disadvantages of the prior art.

More particularly, it is an object of the present invention to provide a rotation rate measuring arrangement which does not possess the disadvantages of the known arrangements of this type.

Still another object of the present invention is so to construct the arrangement of the type here under consideration as to be able to eliminate disturbances or distortions caused by light source fluctuations and/or optical fiber attenuation changes.

A concomitant object of the present invention is so to design the arrangement of the above type as to be relatively simple in construction, inexpensive to manufacture, easy to use, and reliable in operation nevertheless.

In pursuance of these objects and others which will become apparent hereafter, one feature of the present invntion resides in a rotation rate measuring arrangement, comprising an optical fiber arranged to enclose a predetermined area at least once and having two end portions; means for generating a light beam; means for splitting the light beam into two light beam portions; means for directing each of the light beam portions into a different one of the end portions of the optical fiber for propagation toward and beyond the respectively other end portion; means for modulating at least one of the light beam portions prior to entering the respective one end portion of the optical fiber; means for combining the light beam portions after they have emerged from the respective other end portions of the optical fiber into a combined light beam that travels in a predetermined path; a photodetector interposed in the predetermined path and operative for detecting the combined light beam and issuing an output signal in response thereto; and means for deriving the rotation rate from the output signal of the photodetector, including a variable-gain amplifier receiving the output signal of the photodetector and amplifying the same into an amplified output signal; means for separating the amplified output signal into two components having two different frequencies; means for comparing one of the two components with a reference signal of a constant amplitude; and means for so controlling the gain of the variable-gain amplifier in dependence on the result of such comparison as to cause the amplitude of the one component and the reference signal to have a constant relationship with respect to one another.

In accordance with the novel solution, the gain of an amplifier is controlled rather than a modulator. Thus, the properties of the modulator need not be taken into account in implementing the automatic control system for controlling the gain of the amplifier, so that the implementation of this system is straightforward. Furthermore, it is not necessary with this method of control to evaluate several signals in order to determine the rotation rate.

BRIEF DESCRIPTION OF THE DRAWING

An embodiment of the invention will now be explained in more detail with reference to the sole FIGURE of the accompanying drawing, which is a block diagram of the novel rotation rate measuring instrument according to the present invention.

DETAILED DESCRIPTION OF THE PREFERRED EMBODIMENT

Referring now to the drawing in detail, it may be seen herein that a light beam generated in a laser 1 is split into two portions by a beam splitter 2. One of the beam portions passes through a polarizer 17 and a spatial filter 18 to another beam splitter 3, which splits it into two portions again. The spatial filter 18 is implemented as a single-mode optical fiber and ensures that the beam portion emerging from the single-mode optical fiber 18 has only a single mode. The two beam portions emerging from the beam splitter 3 are directed into the two ends 12 and 15 of an optical fiber 5. In the area of one end 12 of the optical fiber 5, there is provided a phase modulator 4 which phase-modulates one of the beam portions before it enters the optical fiber 5, and the other beam portion after its passage through the optical fiber 5. The optical fiber 5 is arranged in the form of a coil. After travelling through the optical fiber 5 in opposite directions, the two beam portions reach the beam splitter 3 again, where they are recombined. The light beam produced by the combination is routed to the first beam splitter 2. The latter deflects a portion of this light beam onto a photodetector 6, which converts the optical signal into an electric signal. The arrangement described so far corresponds to the prior art arrangements.

According to the present invention, the output signal of the photodetector 6 is fed to a variable-gain amplifier 7. The output signal of the amplifier 7 is applied to a first bandpass filter 8, whose midfrequency is $f_m$, and to a second bandpass filter 9, whose midfrequency is $2f_m$. The two bandpass filters 8 and 9 thus pass only signals of the frequencies $f_m$ and $2f_m$, respectively. The signal of the frequency $f_m$ is fed to a phase-sensitive detector 16. The signal of the frequency $2f_m$ is fed to a detector 10, whose output signal is applied to an operational amplifier 11. A suitable operational amplifier is the component 0P07 of Precision Monolithics Inc., Santa Clara, Calif., USA. The other signal applied to the operational amplifier 11 is a reference $U_R$. In the operational amplifier 11, the detector output signal and the reference signal $U_R$ are compared and, based on the result of this comparison, a control signal is produced for the variable-gain amplifier 7. This control maintains the amplitude of the output signal of the variable-gain amplifier 7 constant, regardless of variations in the intensity of the laser output signal and regardless of variations in the attenuation in the light-propagation paths.

A second input of the phase-sensitive detector 16 is presented with the output signal of an oscillator 13 of frequency $f_m$. This signal is also applied to an amplifier 14, whose output is the control signal for the phase modulator 4. As phase-sensitive detection is effected in the detector 16, the sign of the rotary motion is obtained.

The output signal of the photodetector 6 can be described by $$i(t) \sim I \cdot \left[ 1 + J_0\left(2\phi_0 \sin\frac{2\pi f_m \tau}{2}\right) \cdot \cos\Delta\phi_s \right] +$$

$$2J_0 \cdot J_1\left(2\phi_0 \sin\frac{2\pi f_m \tau}{2}\right) \cdot \sin\Delta\phi_s \cos[2\pi f_m(t - \tau/2)] -$$

$$2I_0 \cdot J_2\left(2\phi_0 \sin\frac{2\pi f_m \tau}{2}\right) \cdot \cos\Delta\phi_s \cdot \cos[2\pi 2f_m(t - \tau/2)]$$

wherein
- $I_0$ = the intensity of the light beam emitted by the laser 1
- $J_0, J_1, J_2$ = Bessel functions
- $\tau$ = the time required for the light beam to pass through the coiled optical fiber
- $\Delta\phi_s$ = the Sagnac phase shift.

If the variable-gain amplifier 7 is controlled so that the amplitudes of the output signal of the detector 10 and the reference signal $U_R$ are equal, the output signal of the phase-sensitive detector 16 can be described by $$U_S = U_R \cdot \frac{K_1}{K_2} \cdot \frac{J_1(\ldots)}{J_2(\ldots)} \cdot \frac{\sin\Delta\phi_s}{\cos}$$

$$\tan\Delta\phi_s = \tan(k_3 \cdot \Omega)$$

wherein
- $\Omega$ = the rotation rate
- K1, K2, K3 = constants.

$\Omega$ can be determined from the equation for $U_S$.

In determining the dimensions of the rotation rate measuring instrument, care must be taken to ensure that the measurements to not become ambiguous in the range in which angular velocities are to be measured. The measurements become ambiguous if $\Delta\phi_s \geq 90°$. If the maximum rotation rate to be measured is 400°/s, and the wavelength $\lambda$ of the light to be used is 820 nm, the rotation rate measuring instrument can be dimensioned as follows: length of the optical fiber = 100 m; radius of the coiled optical waveguide = 35 mm.

While we have described above the principles of our invention in connection with specific apparatus, it is to be clearly understood that this description is made only by way of example and not as a limitation to the scope of our invention as set forth in the objects thereof and in the accompanying claims.

We claim:

1. A rotation rate measuring arrangement, comprising an optical fiber arranged to enclose a predetermined area at least once and having two end portions;
   means for generating a light beam;
   means for splitting said light beam into two light beam portions;
   means for directing each of said light beam portions into a different one of said end portions of said optical fiber for propagation toward and beyond the respectively other end portion;
   means for generating a predetermined modulation frequency;
   means responsive to said generating means for modulating with said predetermined modulation frequency at least one of said light beam portions prior to entering the respective one end portion of said optical fiber;
   means for combining said light beam portions after they have emerged from said respective other end portions of said optical fiber into a combined light beam that travels in a predetermined path;
   a photodetector interposed in said predetermined path and operative for detecting said combined light beam and issuing an output signal in response thereto; and
   means for deriving the rotation rate from said output signal of said photo detector, including
   a variable-gain amplifier receiving said output signal of said photodetector and amplifying the same into an amplified output signal;
   means for separating said amplified output signal into two components having two different frequencies, the frequency of a first one of said components being substantially equal to said predetermined modulation frequency;
   means responsive to differences in phase between said first component and the output of said generating means for outputting a signal indicative only of said rotation rate
   means for comparing a second one of said two components with a reference signal of a constant amplitude; and
   means for so controlling the gain of said variable-gain amplifier in dependence on the result of such comparison as to cause the amplitude of said second component and said reference signal to have a constant relationship with respect to one another.

2. The arrangement as defined in claim 1, wherein said second of said two components is equal to twice said modulation frequency.

* * * * *